(12) United States Patent
Kawanishi et al.

(10) Patent No.: US 6,877,004 B2
(45) Date of Patent: Apr. 5, 2005

(54) METHOD OF RELATING INFORMATION SYSTEMS

(75) Inventors: Yasunori Kawanishi, Kawasaki (JP); Yuichi Maeno, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 09/941,361

(22) Filed: Aug. 28, 2001

(65) Prior Publication Data

US 2003/0004943 A1 Jan. 2, 2003

(30) Foreign Application Priority Data

Jun. 27, 2001 (JP) ....................................... 2001-193910

(51) Int. Cl.[7] ............................................. G06F 17/30
(52) U.S. Cl. ............................... 707/7; 707/5; 707/10; 705/11
(58) Field of Search ............................. 707/1, 3, 5, 7, 707/10, 104.1, 6; 705/30, 35, 11; 712/1

(56) References Cited

U.S. PATENT DOCUMENTS

| | | | | |
|---|---|---|---|---|
| 6,029,144 A | * | 2/2000 | Barrett et al. | 705/30 |
| 6,112,188 A | * | 8/2000 | Hartnett | 705/35 |
| 6,119,103 A | * | 9/2000 | Basch et al. | 705/35 |
| 6,578,056 B1 | * | 6/2003 | Lamburt | 707/7 |
| 2002/0019765 A1 | * | 2/2002 | Mann et al. | 705/11 |
| 2002/0129221 A1 | * | 9/2002 | Borgia et al. | 712/1 |

FOREIGN PATENT DOCUMENTS

JP   10-063716   3/1998

OTHER PUBLICATIONS

Joel T. Patz, Employee Appraiser 3.0—Best Manager Edition, Sep. 1, 1996, Windows Magazine, n 709, p. 116.*
Jim Rapoza, Avantos Performance Systems review Writer 2.0, Jul. 10, 1995, PC Week, v12, n27, P80(1).*
Michael G. Rubin, Work with Data Processing and Win, Jul. 1999, Data Bases Advisor, v9, n7, P76(4).*
Next generation of Web–based PerformanceManager Product, Mar. 22, 2000, Business Wire, P97.*

* cited by examiner

Primary Examiner—Charles Rones
Assistant Examiner—Hassan Mahmoudi
(74) Attorney, Agent, or Firm—Townsend and Townsend and Crew LLP

(57) ABSTRACT

The first information system outputs request data, opinion data, personnel goal data, and policy evaluation data and transmits the data to the second information system, which receives the data and stores it as a corresponding database in the storage device. The data relation information generator references each database, generates request point data from request data and opinion data, goal point data from request point data and personnel goal data, and policy evaluation point data from policy evaluation data, performance evaluation point data from goal point data and policy evaluation point data, and stores each of the generated data as a corresponding database in the storage device.

4 Claims, 13 Drawing Sheets

METHOD OF RELATING INFORMATION SYSTEMS

CROSS REFERENCE TO RELATED APPLICATION

This application is related to and claims priority from Japanese Application No. 2001-193910, filed Jun. 27, 2001.

BACKGROUND OF THE INVENTION

This invention relates to a method of automating the procedure of a plurality of task operations, more particularly to a method of relating specific information systems that have been constructed to aid in carrying out respective tasks by relating data shared among the information systems.

In recent years, in the midst of structural innovation of public agencies, performance evaluation systems are being revamped to improve public services. For example, instead of a conventional promotion and advancement system based on the length of service and the school of a staff member, an ability evaluation system of combining sure rewards with punishments that evaluates performance based on a provision rating of services to the users of the public services and a user-satisfaction rating is likely to be introduced.

However, when this kind of ability evaluation system is introduced, there is a fear that various problems might arise. For example, there will be a problem that, unless there is a good reason for the ability evaluation of a staff member, the aspiration of the staff member will fall rather than rise, which can lead to poor public services.

A conventional performance evaluation system, in which a performance goal is set on a voluntary basis by a staff member or a sector and an evaluator defines an achievement rate and calculates an ability evaluation coefficient, has a drawback in that it is difficult to determine the appropriateness of the performance evaluation goal, especially the extent to which policies will contribute to improved public services.

In addition, even if the achievement rate of a performance goal is defined, there is a problem that it is difficult to determine quantitatively and objectively the extent to which the performance goal has been achieved.

Furthermore, as a widespread of the Internet has come to further networking of computers of companies and public agencies, electronic public services are being given attention. Electronic public services electronically gather requests and opinions from customers of companies and users of public agencies and makes information of the companies and the public agencies available to the customers and the users. In particular, the proliferation of electronic public services makes it easier for the users to access the public agencies, increasing the opportunities of exchanging various kinds of information between scores of users and the public agencies.

However, there is a fear that such an increase in the opportunities of exchanging information on such electronic public services might pose a lot of problems. For example, if public agencies adopt requests and opinions of the users and make information about their policies available to the users electronically, there will be a problem that it becomes difficult to determine to what policy and how the requests and opinions of the users have been reflected.

With a conventional electronic public service system, although requests and opinions are adopted from users of public agencies, it has been difficult to see the extent to which the requests and opinions have been reflected to the policies. There is another problem that, if there is a rise in public opinion, public agencies have taken steps by making inquiries for putting it to a vote, but if not, the relationship between requests and opinions and policies has been left unseen.

If such problems as mentioned above are encountered, it would be necessary for public agencies to determine quantitatively and objectively the appropriateness of performance evaluation goals of staff members and, in particular, their policies and verify the relationship between the requests and opinions of the users and the policies.

With a conventional performance evaluation system, it has been required to separately adopt a user's opinion on a performance evaluation goal proposed by a staff member or a sector, especially on policies. With conventional electronic public service systems, it has also been required to check requests and opinions from users against policies and make their relationships clear.

BRIEF SUMMARY OF THE INVENTION

This invention comprises the first information system outputting and transmitting a plurality of types of data to the second information system, the second information system receiving the data and performing a process of relating the data, and the resultant being stored in a storing means of the second information system to be referenced by the first information system.

DETAILED DESCRIPTION OF THE INVENTION

Hereinafter, an embodiment of the present invention will be described with reference to the drawings.

Figure 1:
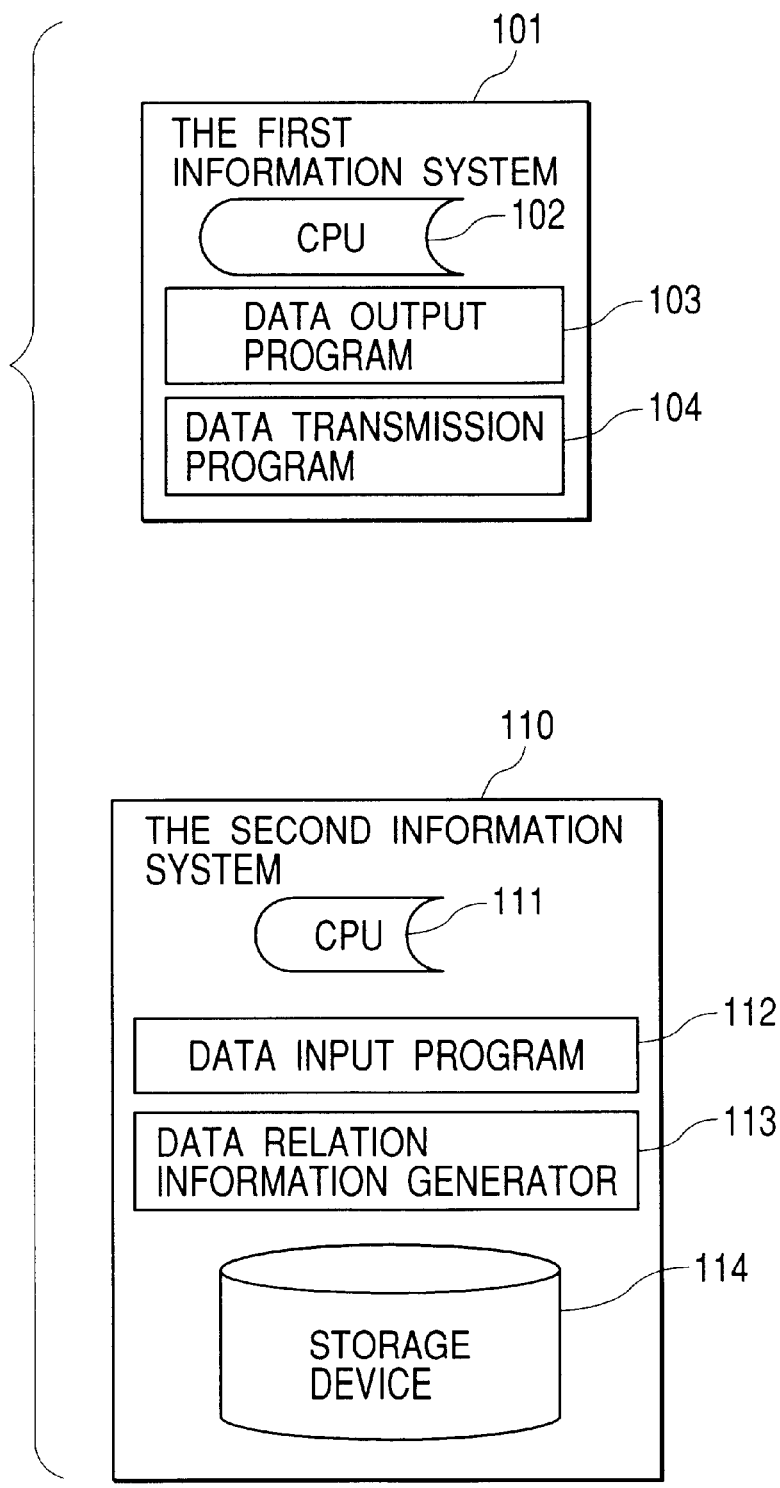
FIG. 1 is a drawing showing an example structure of a system embodying the concept of the present invention.

The structure of a system embodying the concept of the present invention is found in FIG. 1.

As shown in the drawing, a system embodying the concept of the present invention comprises the first information system 101 and the second information system 110 that are interconnected.

The first information system 101 comprises a CPU 102, a data output program 103, and a data transmission program 104, and the second information system 110 comprises a CPU 111, a data input program 112, a data relation information generator 113, and a storage device 114.

This embodiment comprises storing data that has been transmitted between the two information systems, as well as data regarding the data transmission attributes, data regarding the transmission operations, data regarding the relationship between the data, and data regarding the comparison of the contents of the data, thereby making it easier to make relation between the systems.

This embodiment will be described with the use of an example for relating two information systems shown in FIG. 1.

As shown in FIG. 1, this embodiment takes an entry system for an opinion, an entry system for a personnel goal, or an entry system for a policy evaluation as an example of the first information system, and a performance evaluation system as an example of the second information system, respectively.

Therefore, another embodiment may take a form having a plurality of first information systems connected to the second information system.

The entry system for an opinion means a system that is used by users of public agencies to output and transmit request data and opinion data regarding the policies of the public agencies.

The entry system for a personnel goal means a system that is used by staff members of public agencies to output and transmit performance evaluation goal data.

The entry system for a policy evaluation means a system that is used by users of public agencies to output and transmit policy evaluation data regarding the policies of the public agencies.

The performance evaluation system means a system having databases for request data, opinion data, request number data, request point data, policy data, policy evaluation data, policy achievement rate data and performance evaluation data, which accepts requests and opinions from users of public agencies while accepting performance goals from staff members of the public agencies, checking for the difficulty or ease with which the requests from the users can be responded, accepting evaluations for the policies from users, and reflecting the achievement rate of the goal for each staff member to the performance evaluation.

Figure 2:
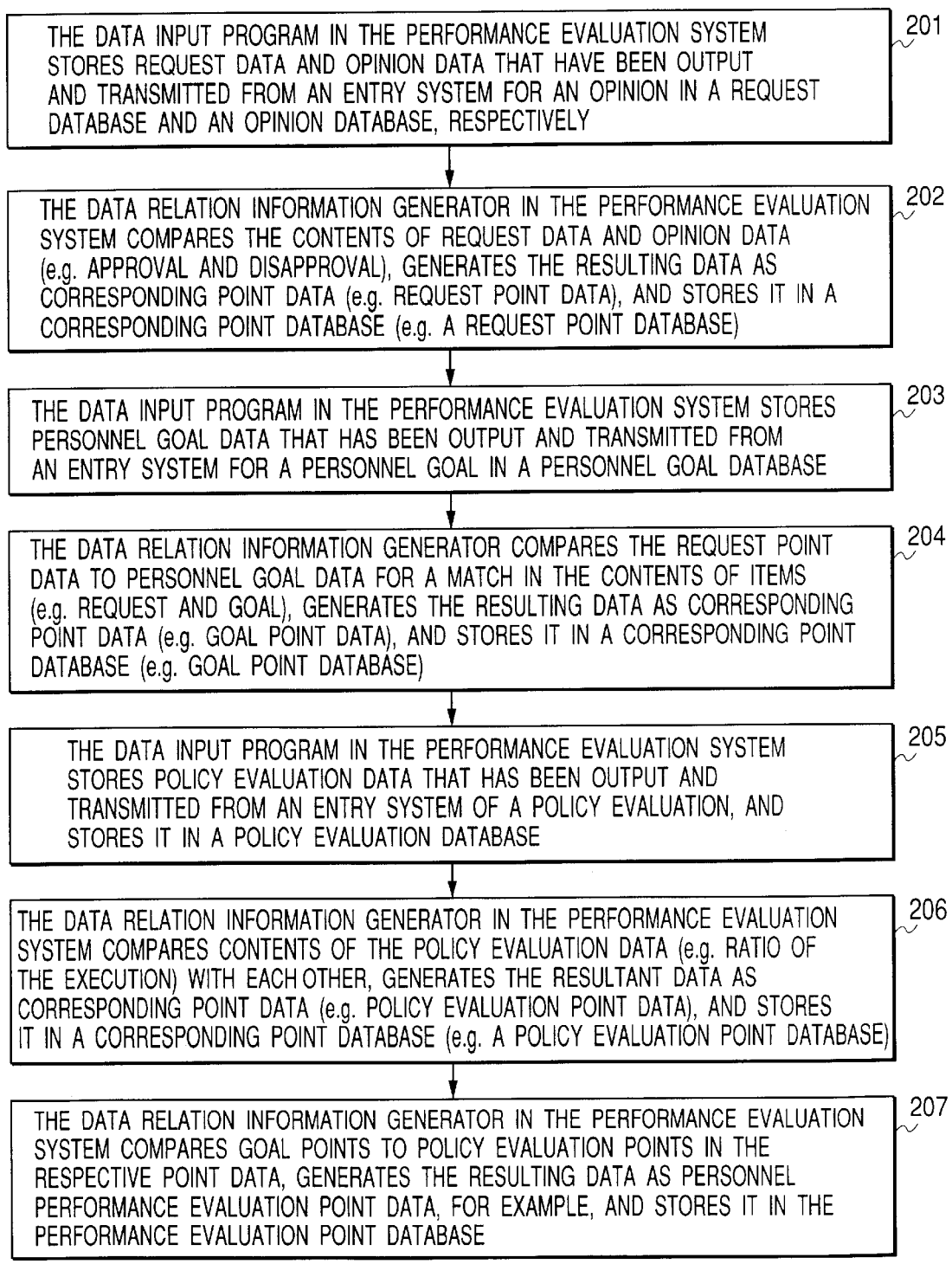
FIG. 2 is a flow diagram of procedural steps of relating information systems in an embodiment of the present invention.

These two information systems are related as shown in FIG. 2 and perform processing:

The data input program in the performance evaluation system stores request data and opinion data that have been output and transmitted from the entry system for an opinion in the request database and the opinion database, respectively (Step 201).

Next, the data relation information generator in the performance evaluation system compares the contents of the request data and the opinion data (e.g. approval and disapproval), generates the resultant data of the comparison as corresponding point data (e.g. request point data), and stores it in a corresponding point database (e.g. a request point database) (Step 202).

Then, the data input program in the evaluation system stores personnel goal data that has been output and transmitted from the entry system for a personnel goal in the personnel goal database (Step 203).

The data relation information generator compares the request point data to the personnel goal data for a match in the contents (e.g. the contents of Request Name and Goal), generates the resultant data of the comparison as corresponding point data (e.g. goal point data), and stores it in a corresponding point database (e.g. a goal point database) (Step 204).

The data input program in the performance evaluation system stores policy evaluation data that has been output and transmitted from the entry system of a policy evaluation in the policy evaluation database (Step 205).

The data relation information generator in the performance evaluation system compares the contents of the policy evaluation data (e.g. the contents of Ratio of the Execution) with each other, generates the resultant data of the comparison as corresponding point data (e.g. policy evaluation point data) and stores it in a corresponding point database (e.g. a policy evaluation point database) (Step 206).

The data relation information generator in the performance evaluation system compares goal points to policy evaluation points in the respective point data, generates the resultant data of the comparison as performance evaluation point data, and stores it in the performance evaluation point database (Step 207).

The specific procedural steps for this embodiment will be described on the basis of the example of the procedural steps for relating information systems shown in FIG. 2 with reference to FIG. 3, FIG. 4, FIG. 5, FIG. 6, FIG. 7, FIG. 8, and FIG. 9.

Figure 3:
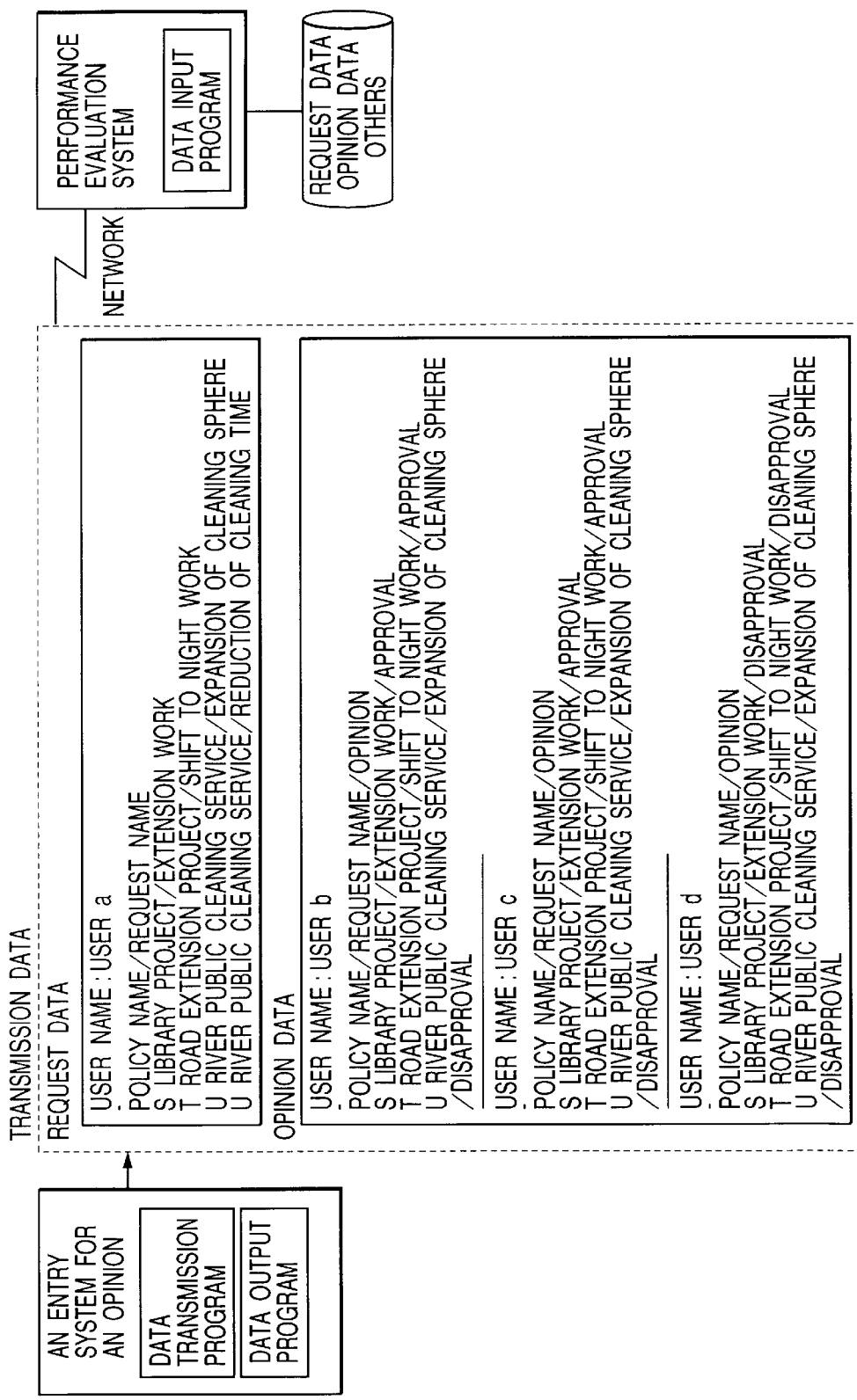
FIG. 3 is a drawing showing a procedure in an embodiment of the present invention, by which request data and opinion data are transmitted from the first information system to the second information system, and are stored in a request database and an opinion database respectively.

FIG. 3 shows a procedure by which data that has been output from the first information system shown in FIG. 1 is transmitted to the second information system and is stored by the data input program in the storage device.

In the example shown in FIG. 3, the data input program of the performance evaluation system stores request data and opinion data that have been output and transmitted from the entry system for an opinion in the request database and the opinion database, respectively.

Request data comprises the contents of User Name, Policy Name, and Request Name (e.g. User a, S library project, extension work).

Opinion data comprises the contents of User Name, Policy Name, Request Name, and Opinion (e.g. User b, S library project, extension work, approval).

Figure 4:
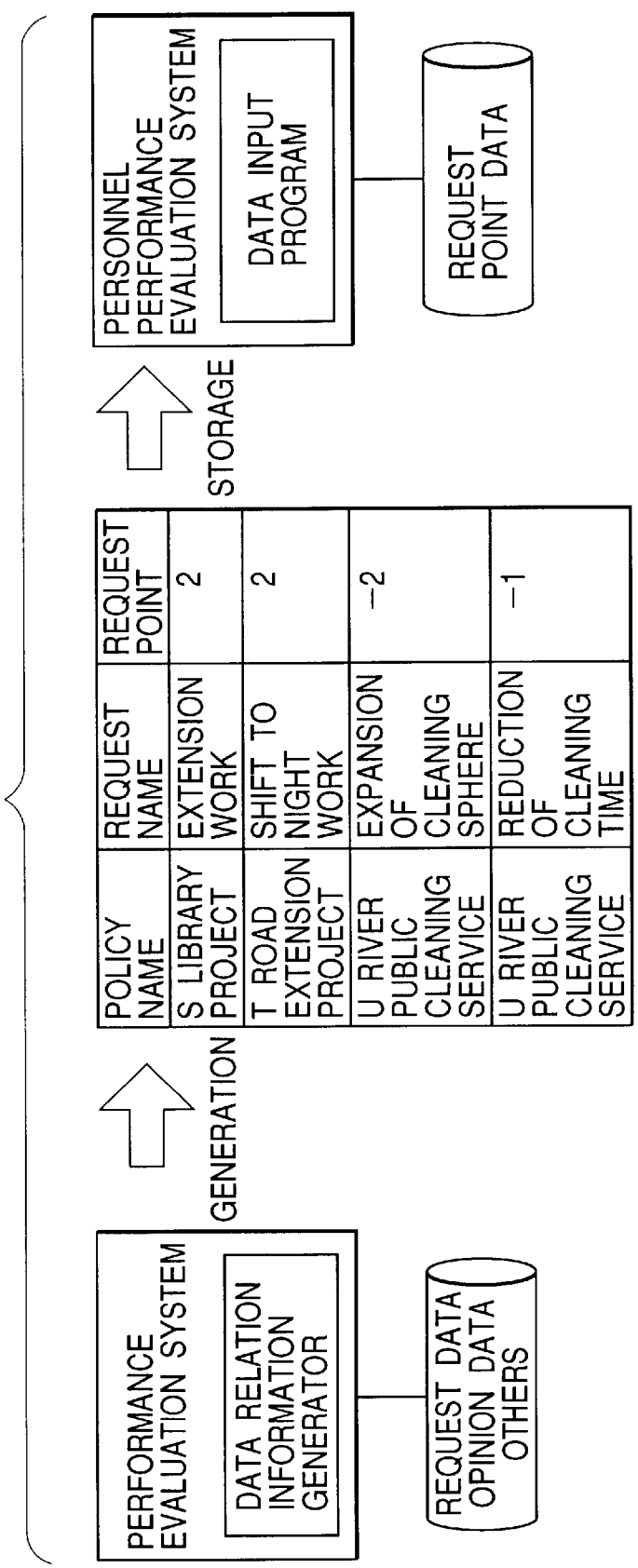
FIG. 4 is a drawing showing a procedure in an embodiment of the present invention, by which a request database and an opinion data base are referenced, request point data is generated, and the request point data is stored in a request point database.

FIG. 4 shows a procedure by which the data relation information generator of the second information system references data from the storage device and generates data regarding the relationship between the referenced data, and the data input program stores the generated data in the storage device.

With the example shown in FIG. 4, the data relation information generator of the performance evaluation system references request data and opinion data from the request database and the opinion database in the storage device and generates data regarding the relationship between the referenced request data and point data as request point data, and the data input program stores the generated request point data in the request point database.

Figure 10:
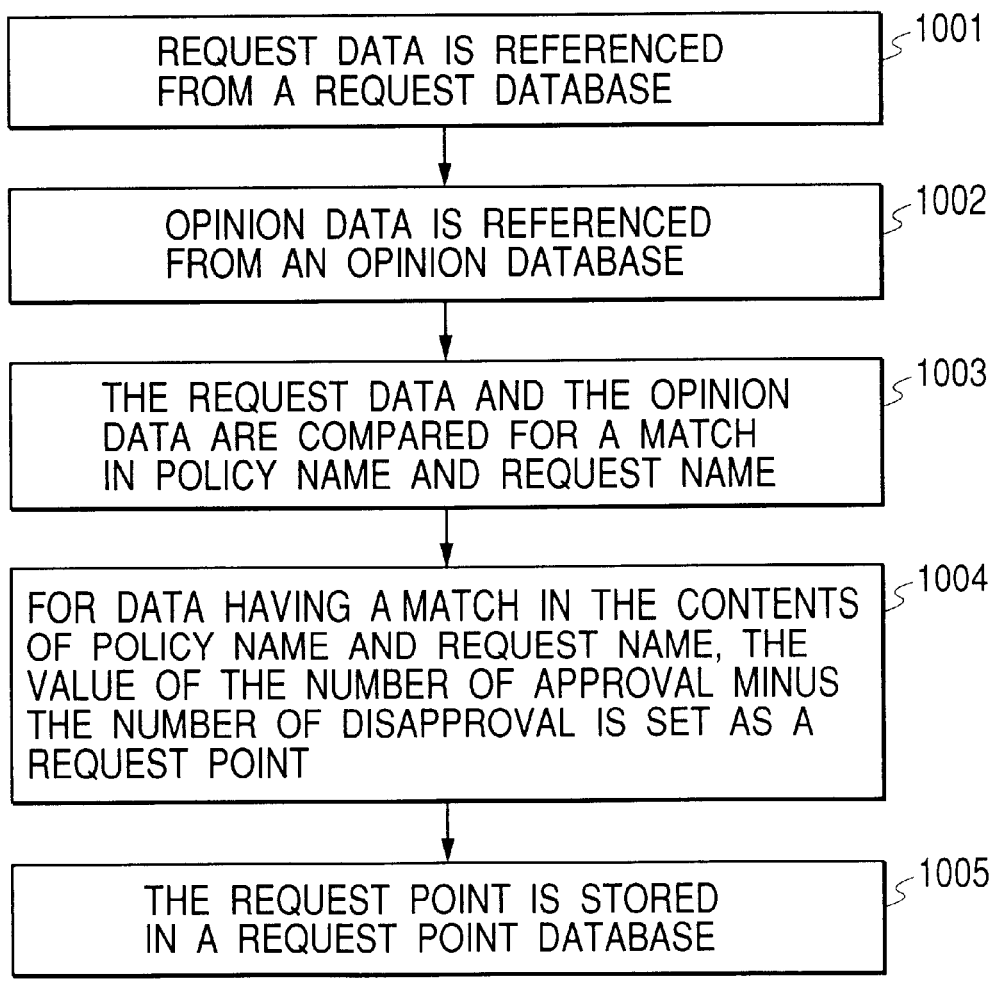
FIG. 10 is a flow diagram showing procedural steps of an embodiment of the present invention, by which request point is generated from request data and opinion data and stored in the request point database.

A method of generating request point data will be described with reference to FIG. 10.

Step 1001: Request data is referenced from the request database.

Step 1002: Opinion data is referenced from the opinion database.

Step 1003: The request data and the opinion data are compared for a match in the contents of Policy Name and Request Name.

Step 1004: For data having a match in the contents of Policy Name and Request Name, the value of "the number of approval minus the number of disapproval" is set as a request point. For request data, the number of the matches in the contents of Policy Name and Request Name is counted as the number of approval for the policy and request concerned.

Step 1005: The request point is stored in the request point database.

For example, if Policy Name is S library project and Request Name is extension work, opinions of User a, User b, and User c are all approval, so the number of approval is "3", and opinion of User d is disapproval, so the number of disapproval is "1". Therefore, the request point is "2".

Figure 5:
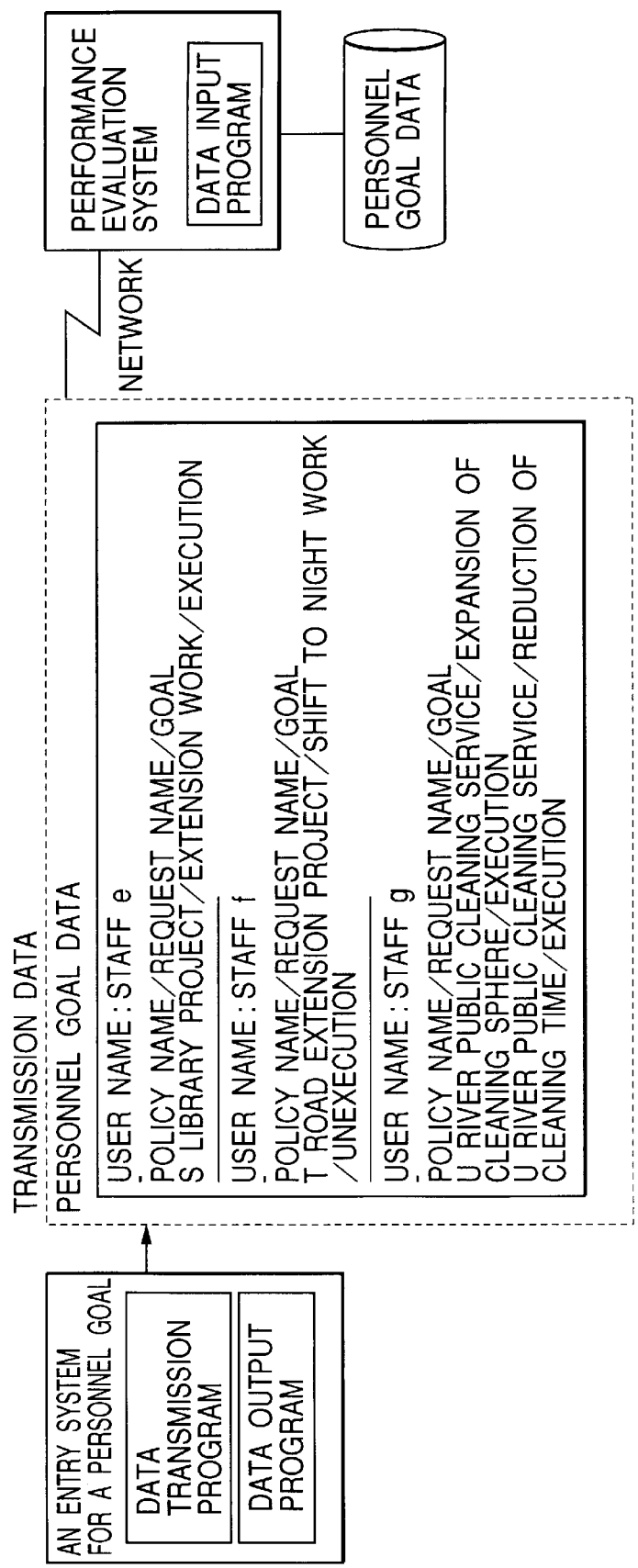
FIG. 5 is a drawing showing a procedure in an embodiment of the present invention, by which personnel goal data is transmitted from the first information system to the second information system and stored in a personnel goal database.

FIG. 5 shows a procedure by which the data input program of the second information system stores in the storage device the data outputted from the first information system shown in FIG. 1 and transmitted to the second information system.

With the example shown in FIG. 5, the data input program of the performance evaluation system stores personnel goal data that has been output and transmitted from the entry system for a personnel goal in the personnel goal database.

Personnel goal data comprises a user name, a policy name, a request name, and a content of a goal (e.g. User e, S library project, extension work, execution).

Figure 6:
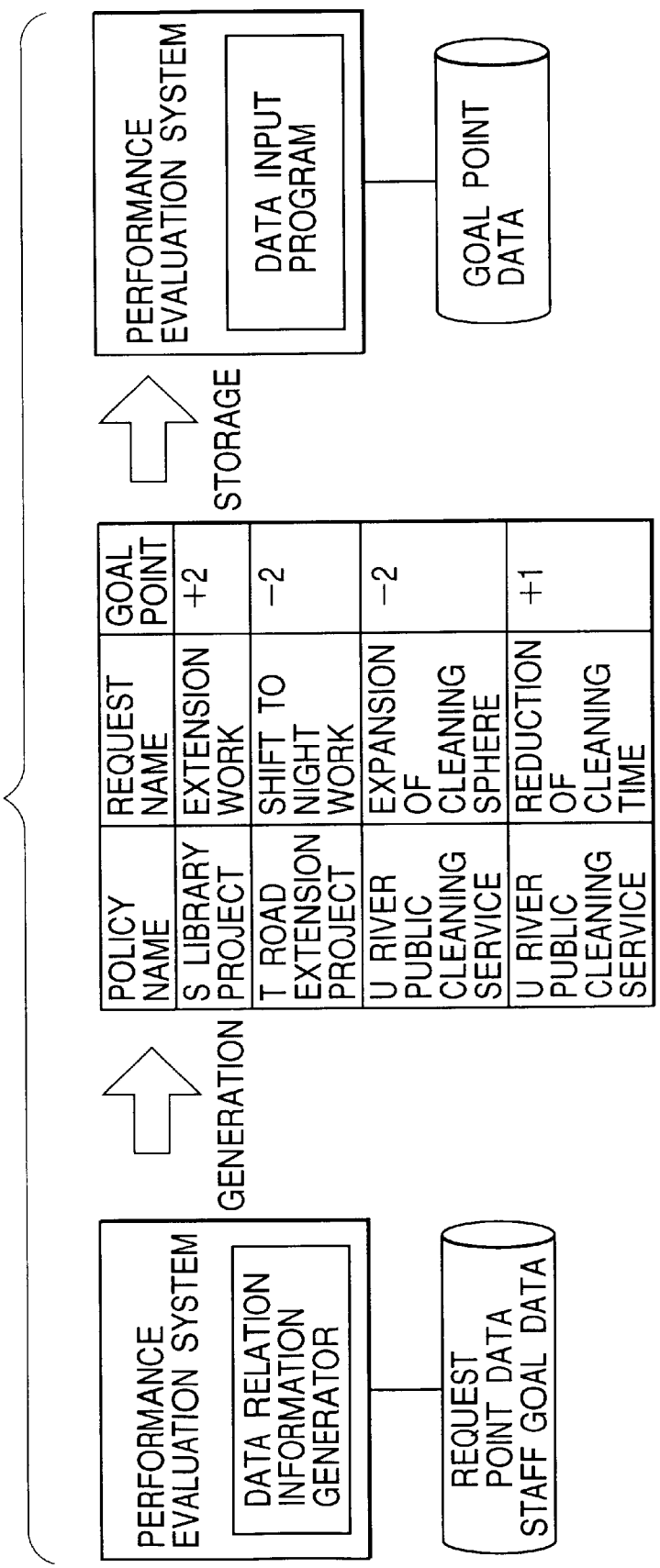
FIG. 6 is a drawing showing a procedure in an embodiment of the present invention, by which the request point database and the personnel goal database are referenced, goal point data is generated, and the goal point data is stored in the goal point database.

FIG. 6 shows a procedure by which the data relation information generator of the second information system references data from the storage device and generates data regarding the relationship between the referenced data, and the data input program stores the generated data in the storage device.

With the example shown in FIG. 6, the data relation information generator of the performance evaluation system references request point data and personnel goal data from the request point database and the personnel goal database in the storage device and generates data regarding the relationship between the referenced request point data and personnel goal data as goal point data, and the data input program stores the generated goal point data in the goal point database.

Figure 11:
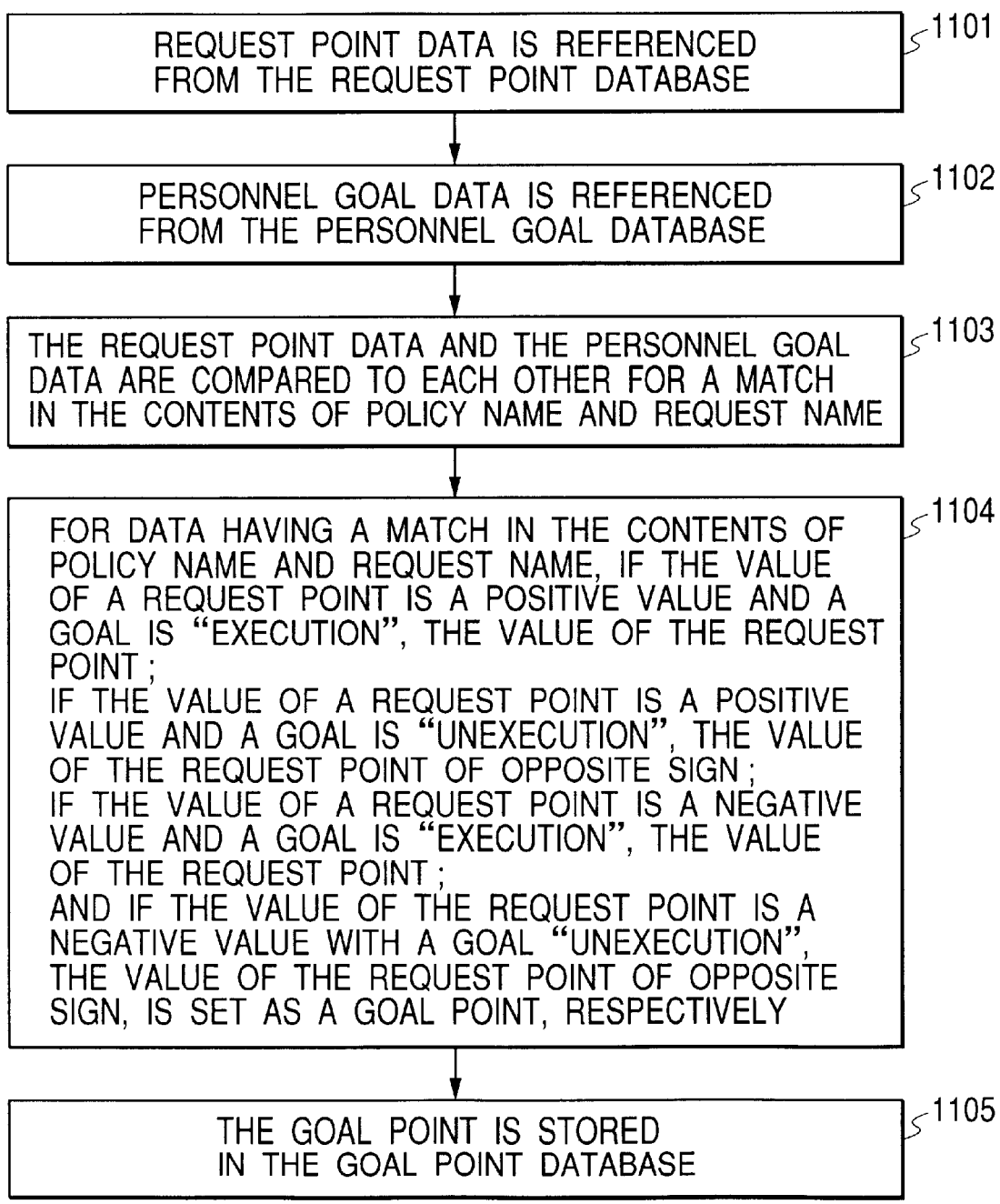
FIG. 11 is a flow diagram showing procedural steps of an embodiment of the present invention, by which goal point is generated from request point data and personnel goal data and stored in the goal point database.

A method for generating goal point data will be described with reference to FIG. 11.

Step 1101: Request point data is referenced from the request point database.

Step 1102: Personnel goal data is referenced from the personnel goal database.

Step 1103: The request point data and the personnel goal data are compared to each other for a match in the contents of Policy Name and Request Name.

Step 1104: For data having a match in the contents of Policy Name and Request Name, (1) if the value of a request point is a positive value with Goal of "execution", the value of the request point;

(2) if the value of a request point is a positive value with Goal "unexecution", the value of the request point of opposite sign;

(3) if the value of a request point is a negative value with Goal "execution", the value of the request point; and (4) if the value of the request point is a negative value with Goal "unexecution", the value of the request point of opposite sign, is set as a goal point, respectively.

Step 1105: The goal point is stored in the goal point database.

For example, since, in request point data, the contents of Policy Name, Request Name, and Request Point are S library project, extension work, and '2', respectively, and, in personnel goal data, the contents of User Name, Policy Name, Request Name, and Goal are Staff e, S library project, extension work, and execution, respectively, this case corresponds to the case (1) above. Therefore, the goal point is '+2'.

Figure 7:
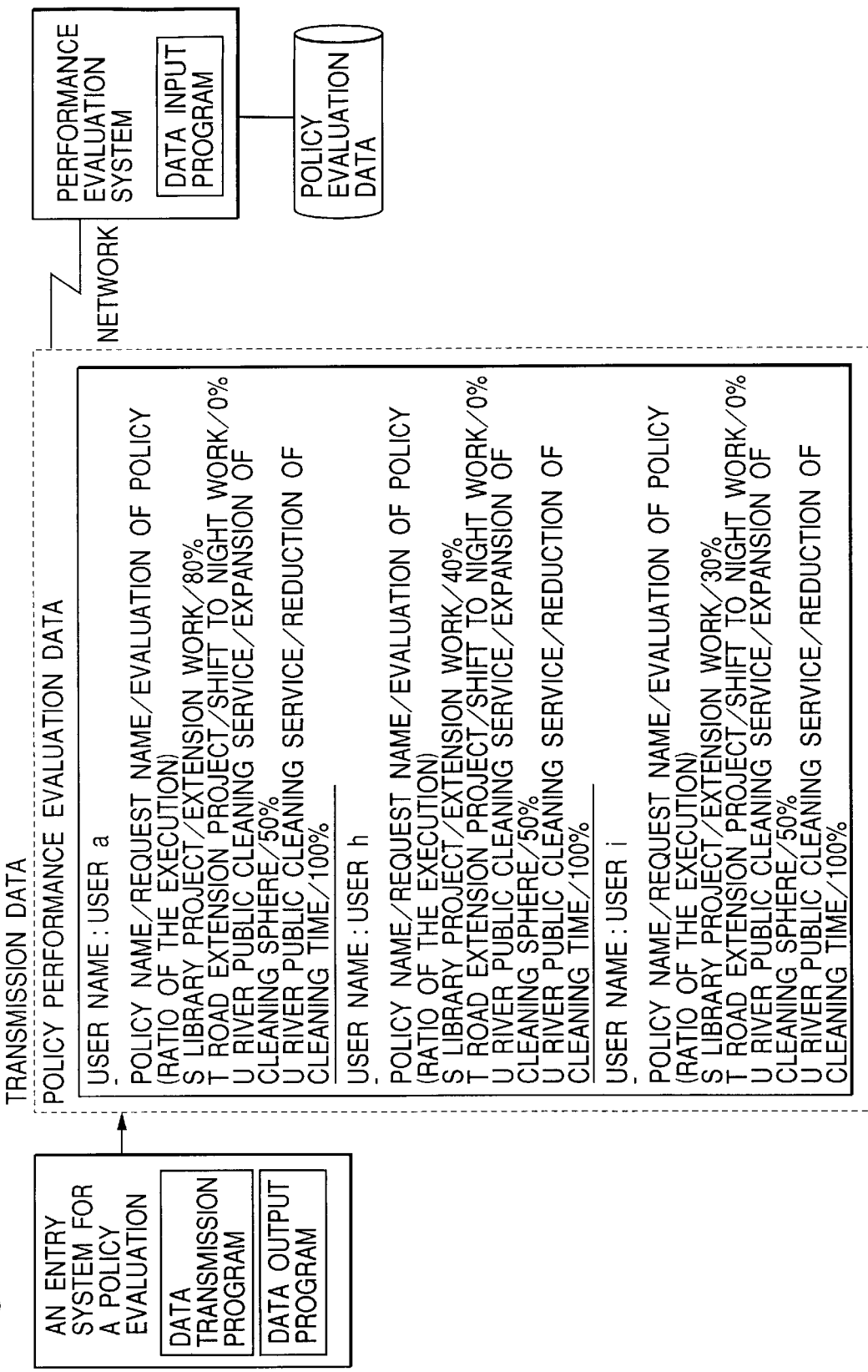
FIG. 7 is a drawing showing a procedure in an embodiment of the present invention, by which policy evaluation data is transmitted from the first information system to the second information system and stored in a policy evaluation database.

FIG. 7 shows a procedure by which data that has been output from the first information system shown in FIG. 1 and transmitted to the second information system is stored by the data input program of the second information system in the storage device.

With the example shown in FIG. 7, the data input program in the performance evaluation system stores policy evaluation data that has been output and transmitted from the entry system for a policy evaluation in the policy evaluation database.

Policy evaluation data comprises the contents of User Name, Policy Name, Request Name, and Evaluation of Policy (Ratio of the Execution) (e.g. user a, S library project, extension work, 80%).

Figure 8:
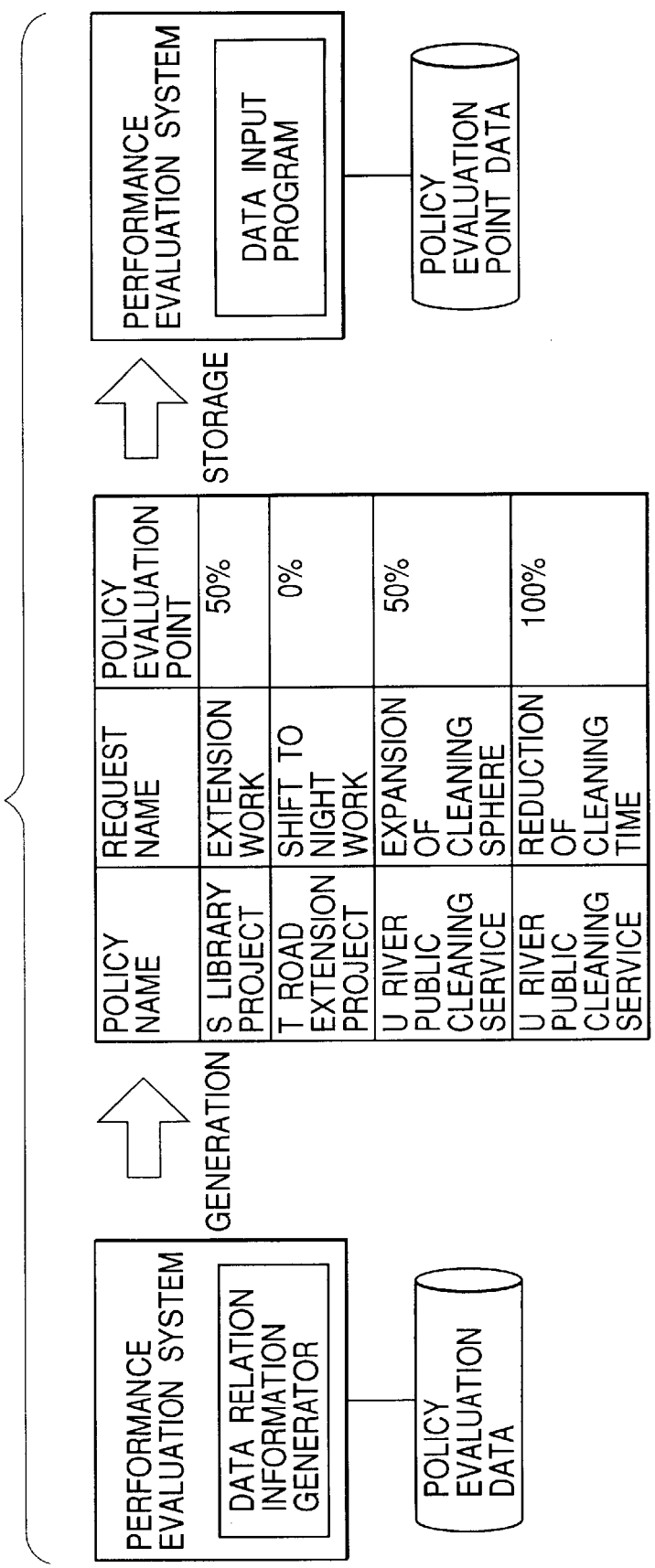
FIG. 8 is a drawing showing a procedure in an embodiment of the present invention, by which the policy evaluation database is referenced, policy evaluation point data is generated, and the policy evaluation point data is stored in a policy evaluation point database.

FIG. 8 shows a procedure by which the data relation information generator of the second information system references data from the storage device and generates data regarding the relationship between the referenced data, and the data input program stores the generated data in the storage device.

With the example shown in FIG. 8, the data relation information generator of the performance evaluation system references policy evaluation data from the policy evaluation database in the storage device and generates data regarding the relationship between the referenced policy evaluation data, and the data input program stores the generated data in the policy evaluation point database as the policy evaluation point data.

Figure 12:
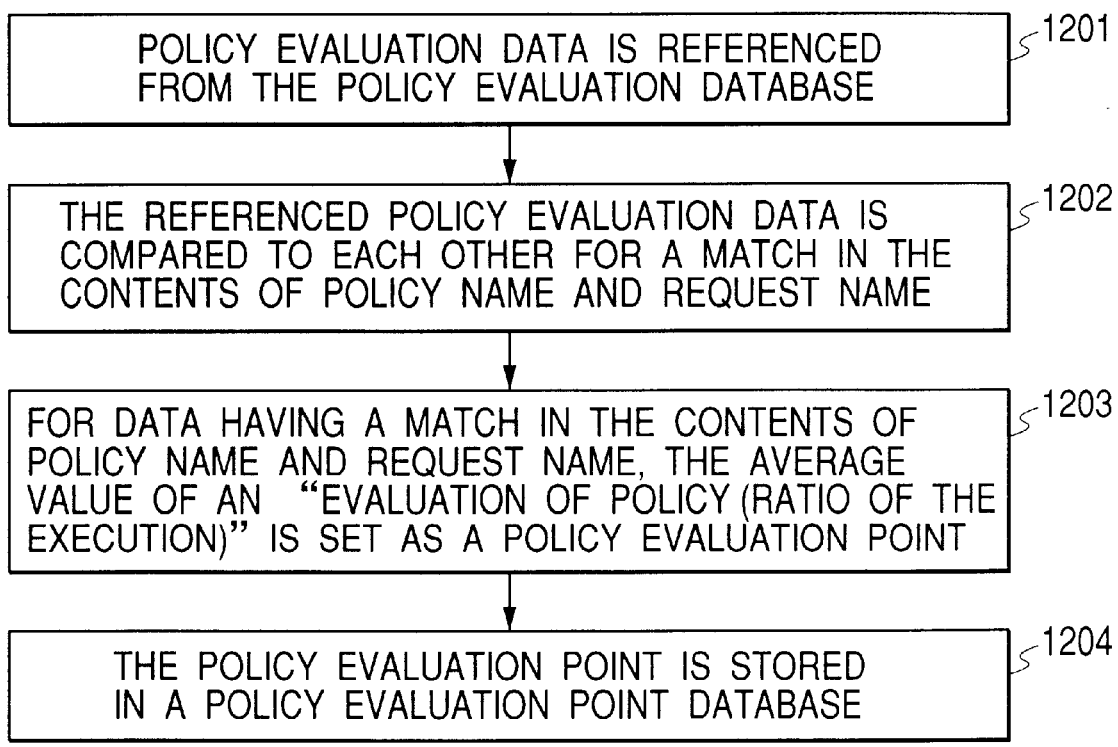
FIG. 12 is a flow diagram showing procedural steps of an embodiment of the present invention, by which policy evaluation point data is generated from the policy evaluation data and stored in the policy evaluation point database.

A method of generating policy evaluation data will be described with reference to FIG. 12.

Step 1201: Policy evaluation data is referenced from the policy evaluation database.

Step 1202: The referenced policy evaluation data is compared to each other for a match in the contents of Policy Name and Request Name.

Step 1203: For data having a match in the contents of Policy Name and Request Name, the average value of the values of Evaluation of Policy (Ratio of the Execution) is set as a policy evaluation point.

Step 1204: The policy evaluation point is stored in the policy evaluation point database.

For example, if Policy Name is S library project and Request Name is extension work, Evaluation of Policy (Ratio of the Execution) of User a is 80%, User h is 40%, and User i is 30%, thus the average value is 50%.

Figure 9:
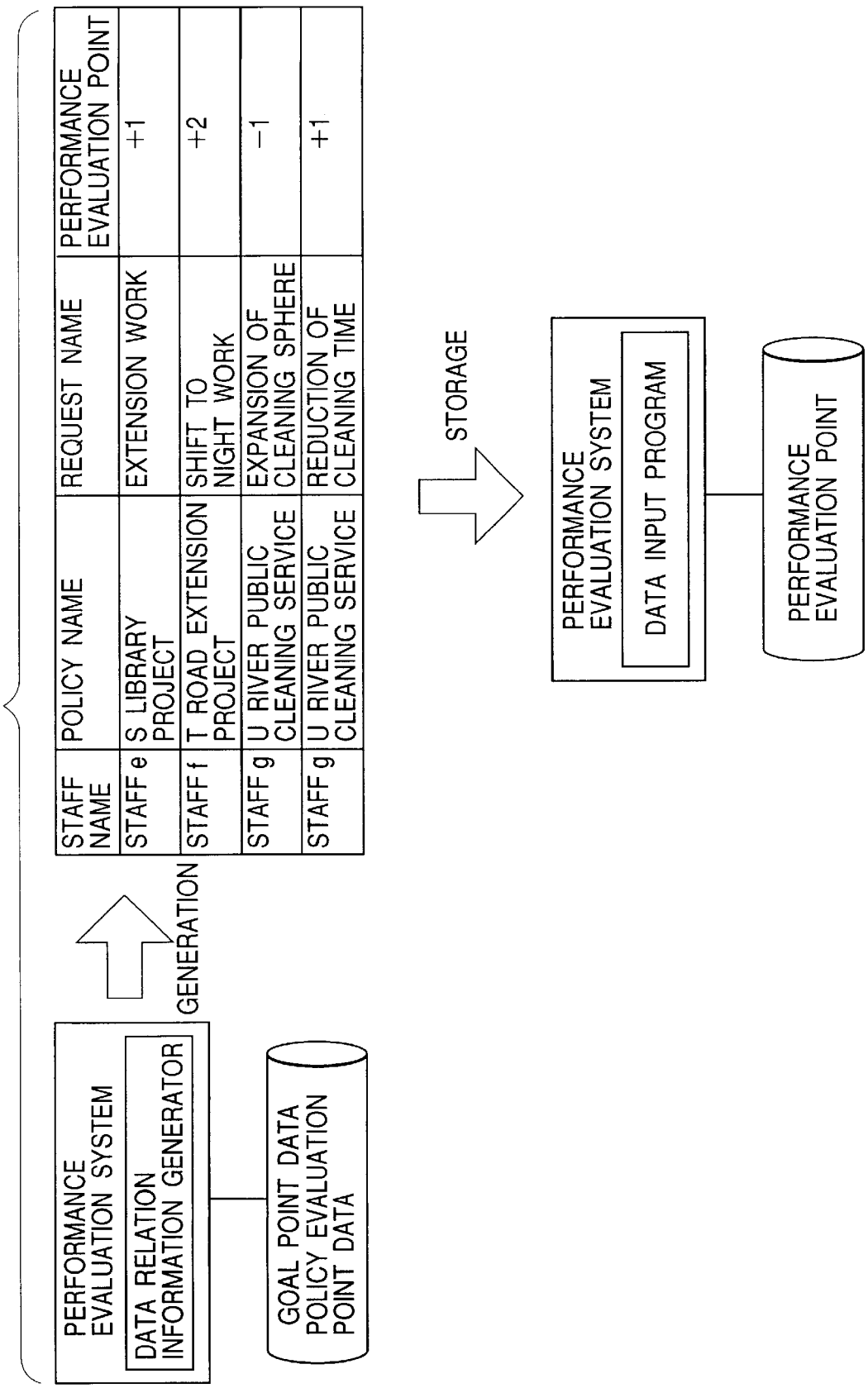
FIG. 9 is a drawing showing a procedure in an embodiment of the present invention, by which the goal point database and the policy evaluation database are referenced, performance evaluation point data is generated, and the performance evaluation point data is stored in a performance evaluation point database.

FIG. 9 shows a procedure by which the data relation information generator of the second information system references data from the storage device and generates data regarding the relationship between the referenced data, and the data input program stores the generated data in the storage device.

With the example shown in FIG. 9, the data relation information generator of the performance evaluation system references data from the goal point database and the policy evaluation point database in the storage device and generates data regarding the relationship between the referenced data as performance evaluation point data, and the data input program stores the generated performance evaluation point data in the performance evaluation point database.

Figure 13:
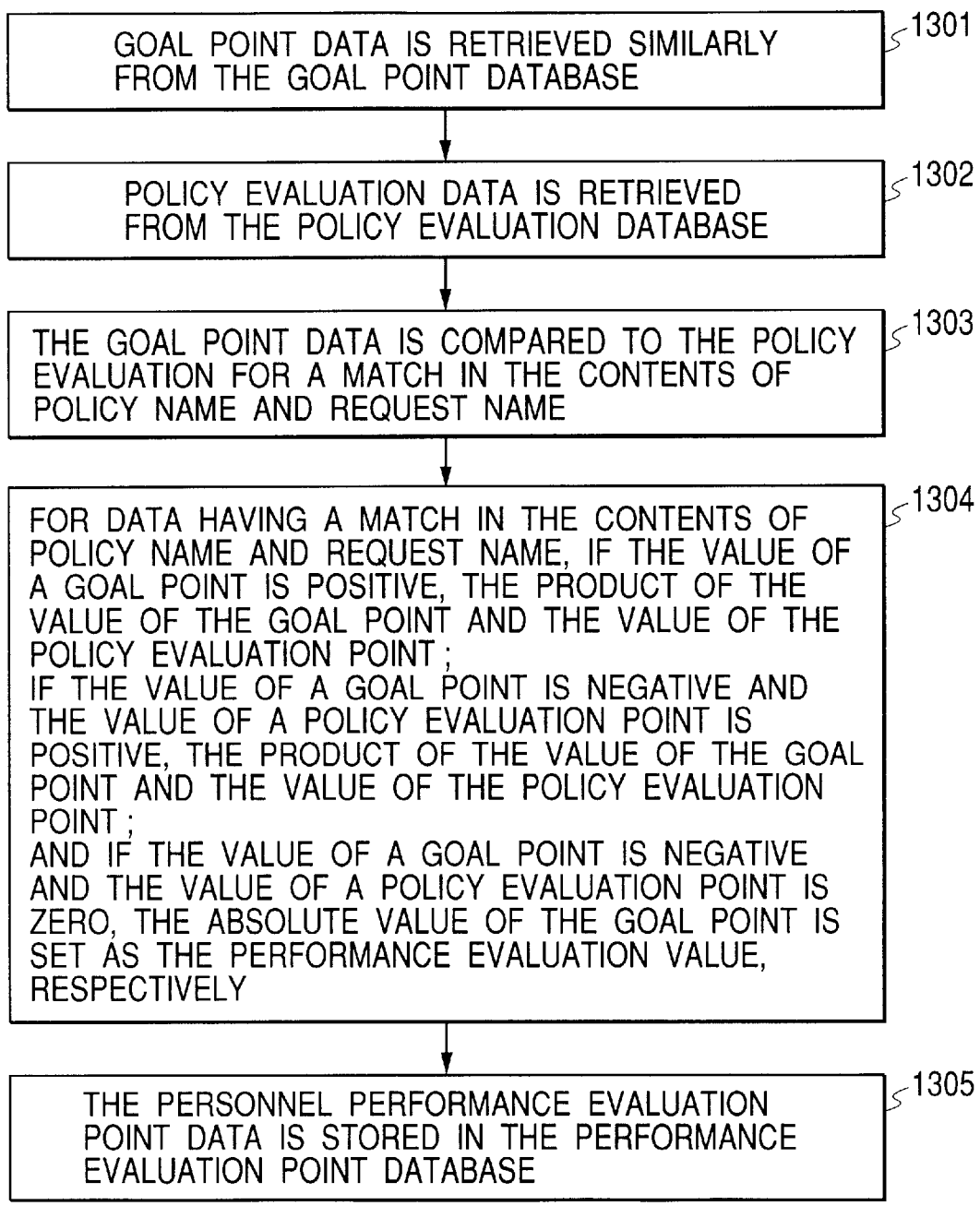
FIG. 13 is a flow diagram showing procedural steps of an embodiment of the present invention, by which performance evaluation point is generated from goal point data and policy evaluation point data and stored in the performance evaluation point database.

A method of generating performance evaluation point data will be described with reference to FIG. 13.

Step 1301: Goal point data is referenced from the goal point database.

Step 1302: Policy evaluation data is referenced from the policy evaluation database.

Step 1303: The goal point data is compared to the policy evaluation data for a match in the contents of Policy Name and Request Name.

Step 1304: For data having a match in the contents of Policy Name and Request Name, if the value of a goal point is positive, the product of the value of the goal point and the value of the policy evaluation point;

if the value of a goal point is negative and the value of a policy evaluation point is positive, the product of the value of the goal point and the value of the policy evaluation point; and if the value of a goal point is negative and the value of a policy evaluation point is zero, the absolute value of the goal point is set a performance evaluation point data, respectively.

Step 1305: The performance evaluation point data is stored in the performance evaluation point database.

For example, if Policy Name is S library project and Request Name is extension work, the value of Goal Point is '+2' and the value of Policy evaluation point is '50%'. Therefore, the value of the performance evaluation point is '+1'.

When problems arise on electronic public services, it will become necessary to verify with quantitative measurability and objectivity the appropriateness of policies that have been proposed by the public agencies and to reflect the appropriateness to a performance evaluation system with efficiency. This embodiment stated above has the following effects on electronic public service systems and a performance evaluation system.

First, request data and opinion data sent from the users to public agencies can be related to the associated policy data of the public agencies.

Second, the extent to which request data and opinion data sent from the users to the public agencies are reflected to the policies can be determined more quantitatively and objectively.

Third, for performance evaluation goal data registered in the performance evaluation system, if the performance evaluation goals are achieved, the extent to which the public services are improved can be determined more quantitatively and objectively.

Fourth, with a performance evaluation coefficient set in the performance evaluation system, the extent to which the performance evaluation goal has been achieved can be determined more quantitatively and objectively.

The embodiment of the present invention makes it easier to reference the data shared among related information systems, thereby speeding the way to understand the relationship among the data and to determine quantitatively and objectively the extent to which the data is reflected to the policies, public services are improved, and performance goals are achieved.

As stated above, for evaluation performed with the use of the data shared among whole related information systems, it will become possible to generate data regarding the relationship among the data as a means for determining the quantitative measurability and objectivity of resultant data of the evaluation and to provide information systems requiring quantitative or objective evaluation data.

What is claimed is:

1. A personnel performance evaluation system implemented on a computer including a first entry system for outputting a plurality of opinions from customers of an entity regarding policies of the entity, a second entry system for outputting personnel goal data of a staff in the entity regarding the policies, a third entry system for outputting evaluations of the customers regarding the policies of the entity, and a network connecting the first, second and third entry systems, comprising:

means for receiving the plurality of opinion data of the customers as either approval or disapproval of the policies, from the first entry system;

means for generating request point data by subtracting a disapproval number from an approval number of the opinion data;

means for receiving the personnel goal data, from the second entry system;

means for generating goal point data by relating the request point data to the personnel goal data;

means for receiving policy evaluation point data indicating policy achievement rates of the policies from the viewpoint of the customers; and means for generating a personnel performance evaluation point by relating the policy evaluation point data to the goal point data, wherein the means for receiving the plurality of opinion data receives a plurality of opinion data including a policy name, a request name indicating a request regarding the named policy, and an opinion of either approval or disapproval regarding the named policy, wherein the means for generating request point data generates the request point data by subtracting the number of disapproval from the number of approval regarding the named policy, wherein the means for receiving the personnel goal data from the second entry system receives the personnel goal data comprising a policy name, a request name indicating a request of the staff regarding a policy defined by the policy name, and a goal indicating execution or non-execution regarding the request of the staff, wherein the means for generating goal point data generates the goal point data in a manner that (1) the goal point is a positive value if the request point is positive and the goal is execution; (2) the goal point is a negative value if the request point is positive and the goal is non-execution; (3) the goal point is a negative value in case the request point is negative and the goal is execution; and (4) the goal point is a positive value in case the request point is negative and the goal is non-execution.

2. A computer implemented personnel performance evaluation method including a first entry system for outputting a plurality of opinions from customers of an entity regarding policies of the entity, a second entry system for outputting personnel goal data of a staff in the entity regarding policies, a third entry system for outputting evaluations of the customers regarding the policies of the entity and a network connecting the first and second and third entry means, comprising:

receiving the plurality of opinion data of the customers as either approval or disapproval of the policies from the first entry system;

generating request point data by subtracting a disapproval number from an approval number of the opinion data, receiving the personnel goal data from the second entry system;

generating goal point data by relating the request point data to the personnel goal data, receiving policy evaluation point data indicating policy achievement rates of the policies from the viewpoint of the customers; and generating personnel performance evaluation point by relating the policy evaluation point data to the goal point data, wherein the step of receiving the plurality of opinion data receives a plurality of opinion data including a policy name, a request name indicating a request regarding the named policy, and an opinion of either approval or disapproval regarding the policy named; and wherein the step for generating request point data generates the request point data by subtracting the number of disapprovals from the number of approvals regarding the named policy, wherein the step of receiving the personnel goal data from the second entry system receives the personnel goal data including a policy name, a request name indicating a request of the staff regarding a policy defined by the policy name, and a goal indicating execution or non-execution regarding the request of the staff, wherein the step of generating goal point data generates the goal point data in a manner that (1) the goal point is a positive value if the request point is positive and the goal is execution, (2) the goal point is a negative value if the request point is positive and the goal is non-execution, (3) the goal point is a negative value if the request point is negative and the goal is execution, and (4) the goal point is a positive value if the request point is negative and the goal is non-execution.

3. A personnel performance evaluation system implemented on a computer including a first entry system for outputting a plurality of opinions from customers of an entity regarding policies of the entity, a second entry system for outputting personnel goal data of a staff in the entity regarding the policies, a third entry system for outputting evaluations of the customers regarding the policies of the entity, and a network connecting the first, second and third entry systems, comprising:

means for receiving the plurality of opinion data of the customers as either approval or disapproval of the policies, from the first entry system;

means for generating request point data by subtracting a disapproval number from an approval number of the opinion data;

means for receiving the personnel goal data, from the second entry system;

means for generating goal point data by relating the request point data to the personnel goal data;

means for receiving policy evaluation point data indicating policy achievement rates of the policies from the viewpoint of the customers; and means for generating a personnel performance evaluation point by relating the policy evaluation point data to the goal point data, wherein the means for receiving the plurality of opinion data receives a plurality of opinion data including a policy name, a request name indicating a request regarding the named policy, and an opinion of either approval or disapproval regarding the named policy, wherein the means for generating request point data generates the request point data by subtracting the number of disapproval from the number of approval regarding the named policy, wherein the means for receiving the personnel goal data from the second entry system receives the personnel goal data comprising a policy name, a request name indicating a request of the staff regarding a policy defined by the policy name, and a goal indicating execution or non-execution regarding the request of the staff, wherein the means for generating goal point data generates the goal point data in a manner that (1) the goal point is a positive value if the request point is positive and the goal is execution; (2) the goal point is a negative value if the request point is positive and the goal is non-execution; (3) the goal point is a negative value in case the request point is negative and the goal is execution; and (4) the goal point is a positive value in case the request point is negative and the goal is non-execution, wherein the means for receiving policy evaluation point data receives a plurality of the policy evaluation point data, wherein the means for generating personnel performance evaluation point generates an average value of the plurality of the policy evaluation point data and sets as a personnel performance evaluation point one of: (1) if the value of a goal point is positive, then the product of the value of the goal point by the average value of the policy evaluation point data; (2) if the value of a goal point is negative and the value of a policy evaluation point is positive, then the product of the value of the goal point and the average value of the policy evaluation point data; and (3) if the value of a goal point is negative and the value of a policy evaluation point is zero, then the absolute value of the goal point.

4. A computer implemented personnel performance evaluation method including a first entry system for outputting a plurality of opinions from customers of an entity regarding policies of the entity, a second entry system for outputting personnel goal data of a staff in the entity regarding policies, a third entry system for outputting evaluations of the customers regarding the policies of the entity and a network connecting the first and second and third entry means, comprising:

receiving the plurality of opinion data of the customers as either approval or disapproval of the policies from the first entry system;

generating request point data by subtracting a disapproval number from an approval number of the opinion data, receiving the personnel goal data from the second entry system;

generating goal point data by relating the request point data to the personnel goal data, receiving policy evaluation point data indicating policy achievement rates of the policies from the viewpoint of the customers; and generating personnel performance evaluation point by relating the policy evaluation point data to the goal point data, wherein the step of receiving the plurality of opinion data receives a plurality of opinion data including a policy name, a request name indicating a request regarding the named policy, and an opinion of either approval or disapproval regarding the policy named; and wherein the step for generating request point data generates the request point data by subtracting the number of disapprovals from the number of approvals regarding the named policy, wherein the step of receiving the personnel goal data from the second entry system receives the personnel goal data including a policy name, a request name indicating a request of the staff regarding a policy defined by the policy name, and a goal indicating execution or non-execution regarding the request of the staff, wherein the step of generating goal point data generates the goal point data in a manner that (1) the goal point is a positive value if the request point is positive and the goal is execution, (2) the goal point is a negative value if the request point is positive and the goal is non-execution, (3) the goal point is a negative value if the request point is negative and the goal is execution, and (4) the goal point is a positive value if the request point is negative and the goal is non-execution, wherein the step for receiving policy evaluation point data receives a plurality of the policy evaluation point data, and the step for generating personnel performance evaluation point generates an average value of the plurality of the policy evaluation point data and sets as a personnel performance evaluation point: (1) if the value of a goal point is positive, the product of the value of the goal point by the average value of the policy evaluation point data, (2) if the value of a goal point is negative and the value of a policy evaluation point is positive, the product of the value of the goal point and the average value of the policy evaluation point data, and (3) if the value of a goal point is negative and the value of a policy evaluation point is zero, the absolute value of the goal point.

* * * * *